(12) United States Patent
Liu et al.

(10) Patent No.: US 9,069,857 B2
(45) Date of Patent: Jun. 30, 2015

(54) PER-DOCUMENT INDEX FOR SEMANTIC SEARCHING

(71) Applicant: MICROSOFT CORPORATION, Redmond, WA (US)

(72) Inventors: Yue-Sheng Liu, Beijing (CN); Xiao-Song Yang, Beijing (CN); Hui Shen, Beijing (CN); Weihu Wang, Beijing (CN); John G. Bennett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 13/687,135

(22) Filed: Nov. 28, 2012

(65) Prior Publication Data

US 2014/0149401 A1    May 29, 2014

(51) Int. Cl.
G06F 17/30    (2006.01)

(52) U.S. Cl.
CPC .... G06F 17/30864 (2013.01); G06F 17/30613 (2013.01)

(58) Field of Classification Search
USPC ......................................... 707/723, 741, 769
See application file for complete search history.

(56) References Cited

U.S. PATENT DOCUMENTS

| | | | |
|---|---|---|---|
| 6,633,868 B1 * | 10/2003 | Min et al. ................................ | 1/1 |
| 7,856,441 B1 * | 12/2010 | Kraft et al. .................... | 707/758 |
| 8,024,329 B1 | 9/2011 | Rennison | |
| 8,396,859 B2 * | 3/2013 | Green et al. ................... | 707/713 |
| 2010/0121838 A1 | 5/2010 | Tankovich et al. | |
| 2010/0205172 A1 | 8/2010 | Luk | |
| 2010/0205202 A1 * | 8/2010 | Yang et al. ..................... | 707/767 |
| 2011/0218989 A1 | 9/2011 | Luo | |
| 2011/0270820 A1 * | 11/2011 | Agarwal ........................ | 707/709 |
| 2012/0084076 A1 | 4/2012 | Boguraev et al. | |

OTHER PUBLICATIONS

Lim, et al., "Efficient Update of Indexes for Dynamically Changing Web Documents", In Proceedings of World Wide Web, vol. 10, Issue 1, Mar. 2007, 30 pages.
Brin, et al., "The Anatomy of a Large-Scale Hypertextual Web Search Engine", In Proceedings of the Seventh International Conference on World Wide Web, Apr. 1, 1998, 25 pages.
Yan, et al., "Inverted Index Compression and Query Processing with Optimized Document Ordering", In Proceedings of 18th International Conference on World Wide Web, Apr. 20, 2009, 10 pages.

* cited by examiner

*Primary Examiner* — Pierre Vital
*Assistant Examiner* — Andalib Lodhi
(74) *Attorney, Agent, or Firm* — Sade Fashokun; Dave Ream; Micky Minhas

(57) ABSTRACT

Methods, computer systems, and computer-storage medium for generating a per-document index used for semantic searching is provided. A document is received and parsed into a plurality of section. Each term in each section is translated in order to at least one of a cache index or a term identifier. Subsequent to translating the terms, each section is separately group encoded to generate the per-document index. The per-document index is stored in association with a data store.

9 Claims, 5 Drawing Sheets

| | | |
|---|---|---|
| 312 | DOC. DATA | D.D. Id$_1$, D.D. Id$_3$, D.D. Id$_8$, D.D. Id$_1$ .... ⌒322 |
| 314 | CUSTOM DICTIONARY | FOURNIER, LAPLACE, TRANSFORMS, .... ⌒324 |
| 310 DOCUMENT 1<br>316 | META-WORD | ⌒326 ⌒328 ⌒330 ⌒332<br>PREFIX$_1$, VALUE Id$_3$, PREFIX$_2$, VALUE Id$_6$ |
| 318 | BODY | ⌒334 ⌒336 ⌒338 ⌒340<br>WORD Id$_1$, CACHE INDEX$_8$, CACHE INDEX$_1$, WORD Id$_3$, |
| 320 | META-STREAMS | ⌒342<br>CACHE INDEX$_6$, WORD Id$_3$, CACHE INDEX$_{10}$ |

*FIG. 3.*

PER-DOCUMENT INDEX FOR SEMANTIC SEARCHING

BACKGROUND

Traditional search ranking algorithms rely on an inverted index to match keywords extracted from search queries to keywords associated with one or more documents. Inverted indices store a mapping from content, such as keywords, to its location in a database file, or in a document or set of documents. Those documents having keywords that match search query keywords are returned as search results.

Search ranking algorithms have been developed, however, that rely on additional information in documents besides keywords in order to return more contextually-meaningful search results that better match user intent. The requirements of these new algorithms along with the ever-increasing size of Web data can present issues regarding the storage of document information.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present invention relate to systems, methods, and computer-storage media for, among other things, generating a per-document index (PDI) used for semantic searching and search ranking. The PDI is forward encoded which preserves the semantic and contextual information of the original document including keywords and surrounding non-keyword terms; this semantic information provides valuable indicators as to the underlying meaning of the document. The PDI is generated in such a way that rich per-document information, including semantic and/or contextual information, of different kinds can be efficiently stored. As well, the information can be accessed and utilized at the time a search query is received without significant search-time penalties.

In one aspect, the PDI is generated by parsing a document into a plurality of sections and, for each section, translating in order each term to either a cache index or a term identifier. Subsequent to translating each term, each section is group encoded and stored in a data store. A PDI generated in this manner can be used in combination with an inverted index to identify contextually-relevant search results. For example, a search query is received which comprises keyword terms and surrounding non-keyword terms having a contextual meaning. The inverted index is accessed, and the search query keyword terms are used to identify a set of documents that contains the keywords. A data store storing PDIs is then accessed, and the PDIs for the set of documents are identified. For each of the documents in the set, the keyword terms in the document are located, and the keyword terms along with surrounding non-keyword terms are analyzed to determine a respective contextual meaning. Those documents that have respective contextual meanings most relevant to the contextual meaning associated with the search query are identified, ranked, and presented in an ordered list to a user on a search results page. The result is a list which better represents contextually-relevant search results than when using an inverted index by itself.

BRIEF DESCRIPTION OF THE DRAWINGS

The present invention is described in detail below with reference to the attached drawing figures, wherein:

FIG. 3 depicts an illustrative data table suitable for storing mappings between document sections and term identifiers or cache indexes in accordance with an embodiment of the present invention;

DETAILED DESCRIPTION

Figure 1:
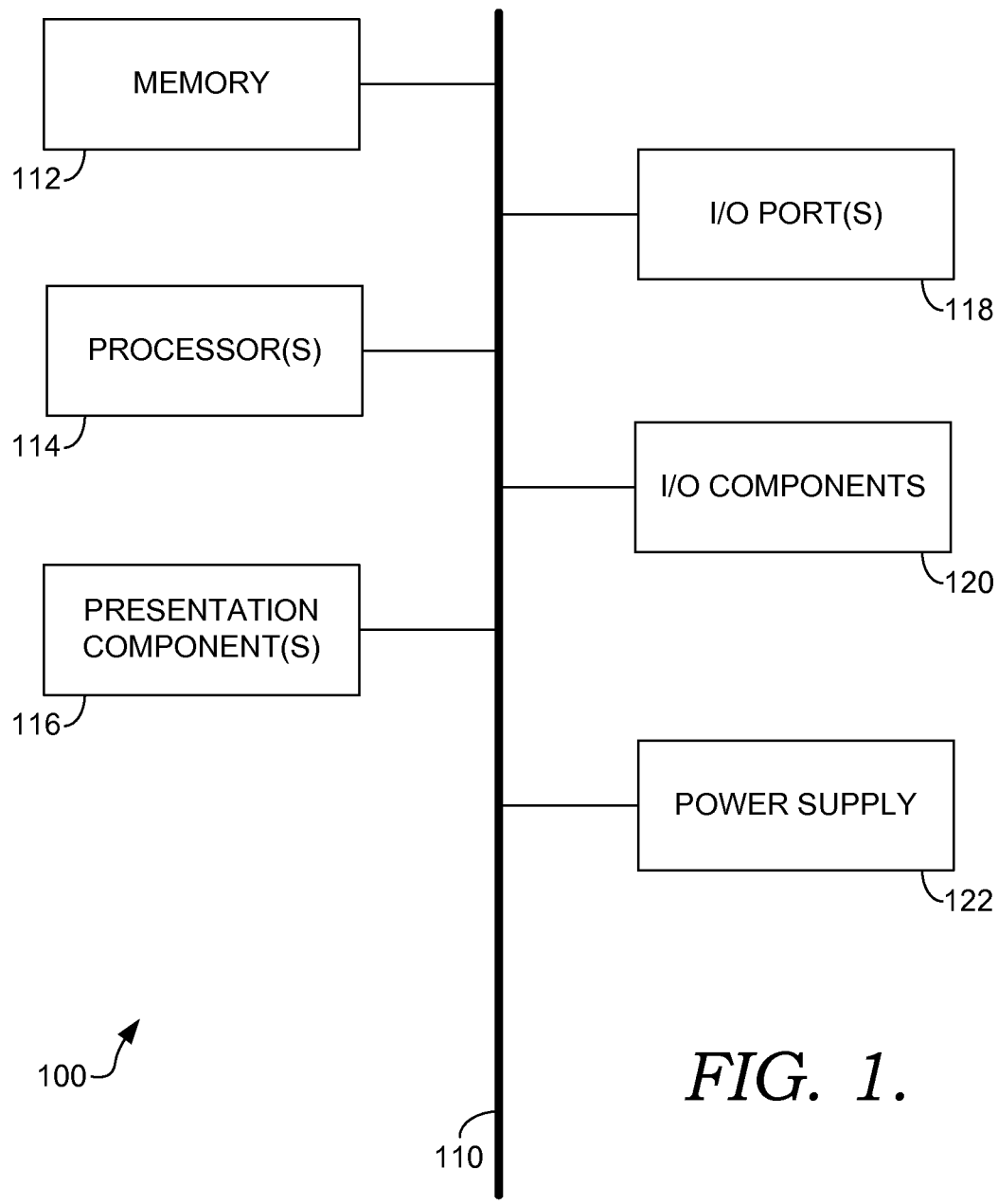
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention relate to systems, methods, and computer-storage media for, among other things, generating a per-document index (PDI) used for semantic searching, search confirmation, and/or search ranking. The PDI is forward encoded which preserves the contextual information along with other information associated with the document. This information may include keywords, surrounding non-keyword terms, annotations associated with the document, metadata associated with the document, and the like. All this information provides valuable indicators as to the underlying meaning of the document. The PDI is generated in such a way that rich per-document information, including semantic and/or contextual information, of different kinds can be efficiently stored. As well, the information can be accessed and utilized at the time a search query is received without significant search-time penalties.

In one aspect, the PDI is generated by parsing a document into a plurality of sections and, for each section, translating in order each term to either a cache index or a term identifier. As used throughout this application, the term "document" includes the document in its original or native form along with any information that may have been added or associated with the document. This information may include annotations and/or metadata that help to augment the understanding of the document's contents and context. Subsequent to translating each term, each section is group encoded and stored in a data store. The PDI data structure may comprise a plurality of sections with each section comprising an in-order arrangement of at least one of terms, term identifiers or cache indexes. The sections include a document data section comprising terms that identify the document, a custom-dictionary section comprising document-specific terms, a body section comprising terms in the document body, one or more metastreams sections comprising terms associated with at least one of document layout, anchor uniform resource locators (URLs), or domain URLs, and one or more meta-word sections comprising terms associated with identified attributes and/or known contexts of the document.

A PDI generated in this manner can be used in combination with an inverted index to identify contextually-relevant search results. For example, a search query is received which comprises keyword terms and surrounding non-keyword terms having a contextual meaning. The inverted index is accessed, and the search query keyword terms are used to identify a set of documents that contains the keywords. A data store storing PDIs is then accessed, and the PDIs for the set of documents are identified, retrieved, and decoded. For each of the documents in the set, the keyword terms in the document are located, and the keyword terms along with surrounding non-keyword terms are analyzed to determine a respective contextual meaning. Those documents that have respective contextual meanings most relevant to the contextual meaning associated with the search query are identified, ranked, and presented in an ordered list to a user on a search results page. The result is a search result list which better represents contextually-relevant search results than when using an inverted index by itself.

An exemplary computing environment suitable for use in implementing embodiments of the present invention is described below in order to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would much more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excludes signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, solid state drives (SSDs), and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, a camera, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a set of one or more processes distributed on one or more computers, one or more stand-alone storage devices, a set of one or more other computing or storage devices, a combination of one or more of the above, and the like.

Figure 2:
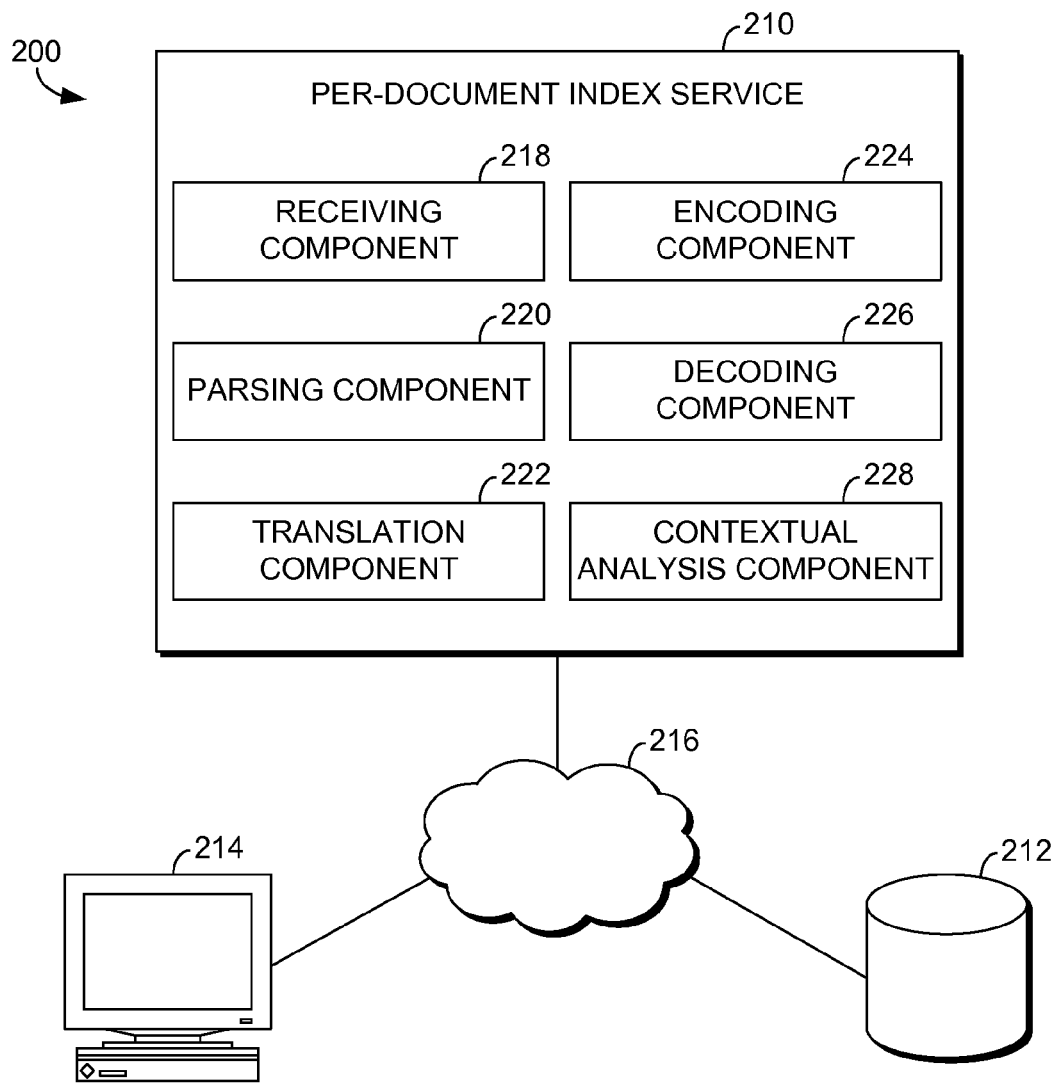
FIG. 2 is a block diagram of an exemplary system for generating a per-document index suitable for use in implementing embodiments of the present invention.

With this as a background and turning to FIG. 2, an exemplary system 200 is depicted for use in generating a per-document index (PDI) for use in semantic or contextual searching and search ranking. The system 200 is merely an example of one suitable system environment and is not intended to suggest any limitation as to the scope of use or functionality of embodiments of the present invention. Neither should the system 200 be interpreted as having any dependency or requirement related to any single module/component or combination of modules/components illustrated therein.

The system includes a per-document index service 210, a data store 212, and an end-user computing device 214 all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

In some embodiments, one or more of the illustrated components/modules may be implemented as stand-alone applications. In other embodiments, one or more of the illustrated components/modules may be integrated directly into, for example, the operating system of the end-user computing device 214 or the per-document index service 210. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the per-document index service 210 might reside on a server, a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

In one aspect, the data store 212 is configured to store one or more per-document indexes (PDIs) or forward indexes (for the purposes of this application, the two terms are used interchangeably). Each PDI stores a forward-encoded document. A document comprises a Web page, a collection of Web pages, representations of documents (e.g., a PDF file), and the like. As mentioned above, a document comprises the document in its native or original form along with any annotations and/or metadata that have been associated with the document. Forward encoding preserves not only the keywords associated with the original document but also the contextual and other information associated with the document including the contextual order of the document. The PDI is structured in such a way as to allow access to both keyword terms and the context surrounding those terms at the time a search query is received without significant search-time penalties. In one aspect, the data store 212 comprises a solid state drive (SSD) that stores the PDI persistently. The data store 212 may also be configured as an inverted index that maps keyword terms to documents that contain those keyword terms.

Additionally, the data store 212 is configured to store information used by the per-document index service 210. For instance, the data store 212 may store section-specific, prefix-specific, culture-specific, language-specific, or custom dictionaries for use in translating terms in a document section to term identifiers. The data store 212 may store attributes and/or known contexts that are identified for each document such as, for example, category classifications of documents, social media references, location information associated with the document, originating language of the document, fingerprint information associated with the document, and the like. These aspects will be explored in greater depth below. The data store 212 may also store information concerning recorded search behavior (query logs, rating logs, browser or search logs, query click logs, browsing times, related search lists, etc.) of users in general. Query click logs provide information on documents selected by users in response to a search query, browsing times provide information on the estimated total time users spend browsing a document, while browser/search logs provide information on documents viewed by users during a search session and how frequently any one document is visited by users. Additionally, rating logs indicate an importance or ranking of a document based on, for example, various rating algorithms known in the art. This information may be used by the per-document index service 210 to carry out various search result ranking algorithms.

The information stored in association with the data store 212 is configured to be searchable for one or more items of information stored in association therewith. The content and volume of such information in the data store 212 are not intended to limit the scope of embodiments of the present invention in any way. Further, though illustrated as a single, independent component, the data store 212 may, in fact, be a plurality of storage devices, for instance, a database cluster, portions of which may reside on the per-document index service 210, the end-user computing device 214, and/or any combination thereof.

The end-user computing device 214 shown in FIG. 2 may be any type of computing device, such as, for example, the computing device 100 described above with reference to FIG. 1. By way of example only and not limitation, the end-user computing device 214 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof. The end-user computing device 214 may receive inputs through a variety of means such as voice, touch, and/or gestures. The end-user computing device includes a display screen. The display screen is configured to present information, including search results, to the user of the end-user computing device 214.

The system 200 is merely exemplary. While the per-document index service 210 is illustrated as a single unit, it will be appreciated that the per-document index service 210 is scalable. For example, the per-document index service 210 may in actuality include a plurality of computing devices in communication with one another. Moreover, the data store 212, or portions thereof, may be included within, for instance, the per-document index service 210 as a computer-storage medium. The single unit depictions are meant for clarity, not to limit the scope of embodiments in any form.

As shown in FIG. 2, the per-document index service 210 comprises a receiving component 218, a parsing component 220, a translation component 222, an encoding component 224, a decoding component 226, and a contextual analysis component 228. In some embodiments, one or more of the components 218, 220, 222, 224, 226, and 228 may be implemented as stand-alone applications. In other embodiments, one or more of the components 218, 220, 222, 224, 226, and 228 may be integrated directly into the operating system of a computing device such as the computing device 100 of FIG. 1. It will be understood that the components 218, 220, 222, 224, 226, and 228 illustrated in FIG. 2 are exemplary in nature and in number and should not be construed as limiting. Any number of components may be employed to achieve the desired functionality within the scope of embodiments hereof.

The receiving component 218 is configured to receive one or more search queries inputted by a user. The search queries may be inputted on a search engine page, a search box on a Web page, and the like. The search query may comprise one or more terms arranged in a defined grammatical pattern or sequence. Some of the terms may comprise keyword terms, while other terms may join the keyword terms, surround the keyword terms, or act as qualifiers of the keyword terms. For the purposes of this application, terms that join or surround keyword terms or act as qualifiers of the keyword terms are known as surrounding terms. For instance, the search query "books for children" may be considered to have two keywords, "books" and "children," and a surrounding word, "for." The word "for" provides context for the search query but is often ignored by traditional ranking algorithms. By way of contrast, the search query "books by children" contains the same two keywords as the search query "books for children," but the surrounding word "by" completely changes the semantic meaning of the search query. In another example, the presence of a qualifier may change the semantic or contextual meaning of the search query. For instance, the search query "non-profit organizations" has a different contextual meaning than the search query "for-profit organizations" although the two search queries may share the same keywords. For the purposes of this application, the terms "semantic" and "contextual" are used interchangeably. Both terms refer to the underlying meaning of a group of words or a phrase.

The receiving component 218 is further configured to receive one or more documents. The documents may be received in response to a Web crawler executing a crawl and extracting documents. As well, the receiving component 218 may receive the documents from a data store such as the data store 212, a document source, or a third-party source. Documents comprise the original document along with any annotations and/or metadata that have been associated with or added to the document.

The parsing component 220 is configured to parse the document into a plurality of sections. The sections may include a document data section, one or more meta-word sections, one or more meta-streams sections, and a body section. The document data section comprises terms or common attributes that identify the document. Such terms may include the author(s), a date the document was created, the reading level, whether the document is classified as "adult content," ratings associated with the document, spam likelihood, the number of pages of the document, and the like.

The body section comprises terms in the main body of the document, and the meta-streams section(s) comprises terms that occur in, for example, the title of the document; headers, section descriptions, footnotes, and endnotes associated with the document; and the like. The meta-streams section(s) may also include anchor uniform resource locators (URLs) that comprise URLs that are determined to reference the document in question, as well as descriptions or phrases found at the anchor URL locations which are believed to be descriptive of the document. Additionally, meta-streams section(s) may include domain URLs that comprise URLs within the document that link to other documents (e.g., hyperlinks), and any URLs associated with the document itself. In general, the meta-streams section(s) provides information regarding the layout of the document and information concerning how the document relates to other documents. In one aspect, the meta-streams section may comprise one section. In another aspect there may be a meta-stream section for terms that define the structure or layout of the document (e.g., title, headers, section descriptors), and a meta-streams section that provides information on how the document relates to other documents (e.g., anchor URLs, hyperlinks, and the like). It is contemplated that there may be more than two meta-streams sections with each section providing information related to document structure and/or document relatedness to other documents. Any and all such aspects are contemplated as being within the scope of the invention.

The meta-words section(s) comprises terms associated with attributes and/or determined contexts of the document. With respect to the meta-words section(s), the parsing component 220 is configured to determine or identify attributes associated with the document and to generate meta-word terms for the identified attributes. There may be many types of attributes associated with a document. For example, one attribute may comprise fingerprints associated with the document. The fingerprint of the document is a snapshot of a portion of the document that uniquely defines some aspect of the document. The fingerprint of a document may be compared to fingerprints of other document to determine duplication or plagiarism. Another attribute may include location information associated with the document. For instance, the parsing component 220 determines the country, state, zip code, and the originating language of the document. Another attribute may include a determined category associated with the document (e.g., if the document is directed to common home repairs, it may be classified in the home improvement category).

The parsing component 220 is configured to generate the terms that describe the attributes. In one aspect, each term comprises a prefix that describes the type of attribute and a value associated with the attribute. For instance, with respect to a zip code associated with the document, the prefix may be "ZIP" and the value may be the actual zip code such as "98052." Thus, the complete meta-word term may comprise "meta_ZIP_98052." In another aspect, each term may comprise just a prefix that describes the type of attribute. Any and all such aspects are contemplated as being within the scope of the invention.

The parsing component is additionally configured to identify known or determined contexts associated with the document. A known or determined context may comprise blog posts related to the document, social media (Facebook®, Twitter®, Instagram®, etc.) comments, likes, or postings associated with the document, applications that reference the document, and the like. By way of illustrative example, the document may be a Web page describing a restaurant. A celebrity included the restaurant name in a blog posting. The portion of the blog associated with the restaurant is identified by the parsing component 220 and is included in a meta-word section. In one aspect, the meta-words section may comprise one section. In another aspect, there may be more than one meta-word section with each section corresponding to a type of attribute or a known context. Any and all such aspects are contemplated as being within the scope of the invention.

The parsing component 220 is further configured to generate a custom-dictionary section by identifying terms in the document that do not ordinarily occur outside of the context of the document. The custom-dictionary section comprises document-specific terms at specified positions within the dictionary.

The translation component 222 is configured to translate or encode in-order (e.g., forward encode) each term in the document data, body, meta-words, and meta-streams sections to either a cache index or a term identifier. Each section is encoded separately by the translation component 222. In-order encoding encodes the terms as they appear in the document and yields the position of the term in the document implicitly. This can be contrasted with an inverted index where the position of the term in the document is explicitly encoded.

The translation component 222 forward encodes each section by accessing a section-specific dictionary that comprises terms commonly associated with the particular section. Each term is at an identified position within the section-specific dictionary, and the position of the term within the dictionary comprises the term identifier for the term. Thus, the term "the" may be found at position 5 within the dictionary; the term identifier for the word "the" would then comprise the number "5." The translation component 222 then replaces the term with its corresponding term identifier. Using term identifiers enables the terms in the document to be compressed, thus taking up less storage space. Further, term identifiers are easy to encode and decode which speeds up the retrieval of search results.

In one aspect, the term identifiers may comprise numerical values. Frequently-used words are associated with smaller term identifiers while less frequently-used words are associated with larger term identifiers. By way of illustrative example, the term "the" may be associated with the term identifier of "5," while the less-frequently used word "especially" may be associated with the term identifier of "1230." Depending on the popularity of the word, the term identifier may be 1-byte, 2-byte, or 3-byte. As mentioned, each section generally has its own section-specific dictionary. However, the body and meta-streams sections may share the same dictionary because of the commonality of terms between these two sections.

In general, the section-specific dictionaries comprise commonly-used section terms. The section-specific dictionaries may be used to generate term identifiers for a plurality of documents. Terms that are unique to the document may not be found in the section-specific dictionary. In this case, the translation component 222 accesses the custom dictionary to identify the respective position of the document-specific term and uses this position as the term identifier for the document-specific word.

With respect to the meta-words section(s), a dictionary may be specialized for a prefix, or may be shared by several prefixes. Alternatively, there may not be a dictionary for a particular prefix. In this case, the prefix is not translated into a term identifier but is stored in its native form. The term identifier for a value associated with a prefix is dependent upon the dictionary used for the value's prefix. By way of illustrative example, the prefix "ZIP" may be encoded using a zip code-specific dictionary. Values associated with the prefix would be encoded using the same zip code-specific dictionary.

With respect to the body and meta-streams sections, the translation component 222 is further configured to process the term identifiers through an entry cache using methods known in the art. When there is a cache miss, the original term identifier is output. If there is a cache hit, a cache index for the term is output. If there is an initial cache miss for a term identifier, the cache allocates a new entry and copies in data from memory. Thus, next time the term identifier is processed, a cache index for that term is outputted. In one aspect, the entry cache is 1,024 terms, and the cache index may be 10 bits. The use of an entry cache further compresses the document data in the PDI.

The encoding component 224 is configured to group encode the different sections using methods known in the art. In general, a section stream is processed 32 bits at a time and contains three operational codes to reduce unpredictable branches during the decoding process. The six high bits of the term are shifted down and used to switch into one of 27 possible packings. Each operational code can indicate: 1) a 10 bit cache index for a meta-stream or body term from the cache; 2) a term identifier for a body term or meta-stream term that was not present in the cache, or term identifiers or terms for terms in the other sections (e.g., meta-data section, document data section, and/or custom-dictionary section); 3) constants for use in position or metadata; and 4) other features of the PDI such as section boundaries, boundaries within the document, and the like. The decoding component 226 is configured to decode the data using, for example, the operational codes.

After encoding, each term in each section may be viewed as having three parts: 1) the position of the term in the document (this is implicitly encoded); 2) the term identifier or a cache index; and 3) any metadata associated with the term. Metadata may include type of font, capitalization, bolding, italicizing, underlining, punctuation, position of the term at the end of a sentence, section or document, and the like. Metadata may also include an attribute of the term and its associated value. For instance, an attribute of a term may include a "date" or a "reading level." These attributes are associated with values. For instance the "date" attribute may have a value of "08/12/12," and the "reading level" attribute may have a value of "4" Up to 64 bits of metadata may be associated with a term; the metadata may be used in ranking algorithms.

The contextual analysis component 228 is configured to perform a number of actions. The contextual analysis component 228 is configured to determine a contextual meaning of a search query by analyzing keyword terms as well as any surrounding terms of a search query received by the receiving component 218. The contextual analysis component 228 is also configured to use the search query keyword terms to identify a set of documents that contains the keyword terms; this may be accomplished by accessing and utilizing an inverted data store stored in association with the data store 212. Once the set of documents is identified, the contextual analysis component 228 accesses the PDIs associated with the set of documents and instructs the decoding component 226 to decode the PDIs associated with the documents. The contextual analysis component 228 then performs contextual analysis of the documents.

In one aspect, for instance, the contextual analysis component 228 locates the instances of the keyword(s) term in each decoded document, constructs a contextual window around the keyword term, and determines a contextual meaning for the contextual window. The contextual window may include a predetermined number of terms surrounding the keyword. In another aspect, the size of the contextual window may be determined on the fly by continually including terms surrounding the keyword term until a contextual meaning is established. For instance, the document may contain the following phrase, "Books by children authors are rare." The keywords terms are "Books" and "children." In this case the contextual analysis component 228 would include all the terms in the sentence in the contextual window because all of the terms establish a contextual meaning for the phrase.

Once the contextual windows have been constructed for the document(s) and the contextual meanings of the windows have been determined, the contextual analysis component 228 is configured to rank the documents within the set based on how relevant each document's contextual window is compared to the contextual meaning of the search query. Those documents having contextual windows that are most relevant to the contextual meaning of the search query are promoted to a higher ranking, while those documents having contextual windows that are unrelated or not relevant to the contextual meaning of the search query are demoted to a lower ranking. The set of documents is then presented as a rank-ordered list on a search results page.

By way of illustrative example, a search query may comprise the phrase, "Books by children." The contextual meaning of this search query can be surmised as "books written by children authors." An inverted index is utilized to identify, for example, two documents that contain the search query keyword terms of "books" and "children." In the first document, a contextual window is constructed that includes the phrase "some great children's books include," while a contextual window in a second document is constructed that includes the phrase "although books by children authors are rare, some examples include." As can be seen, the contextual meaning associated with the second document is more relevant to the contextual meaning of the search query as compared to the contextual meaning associated with the first document. The second document would be ranked higher than the first document and presented before the first document on a search results page.

Continuing, the contextual analysis component 228 is also configured to use the contextual windows to classify documents by category. For example, a document's contextual window may comprise the phrase "hammers and nails are useful tools to install home windows," where "hammer" and "nail" are keyword terms. The contextual analysis component 228 may classify this document in the "home improvement" category. By contrast, a document's contextual window may contain the same keywords but may be classified in a different category. For instance, a document's contextual window may comprise the phrase "We sell hammers and nails at Miller Hardware." The contextual analysis component 228 may classify this document in the "retail" category. The contextual analysis component 228 is further configured to cluster documents with similar categories and present these document clusters together on a search results page.

In yet another example, the contextual analysis component 228 is configured to identify documents whose contextual windows have keyword terms and surrounding terms that share structural pattern similarity with the search query. These documents may be ranked higher than documents whose contextual windows do not share structural pattern similarity with the search query. This is especially useful when a user inputs a long search query phrase. By way of illustrative example, a user may input a query such as "How do I get a taxi at the Beijing airport." Documents that contain the same terms in substantially the same order as the search query may be ranked higher than those documents that contain the terms in a different order.

Turning now to FIG. 3, an exemplary data table 300 is shown representing relationships between document sections and term identifiers and/or cache indexes in a PDI. This data structure is illustrative and exemplary in nature and is not meant to be limiting in any way. The purpose of FIG. 3 is to portray concepts and relationships between various data elements and not the actual arrangement of data in a data store. As such, instead of using actual term identifier values and/or cache indexes, textual descriptions of these values are used instead (e.g., "cacheIndex$_1$").

As shown in table 300, a document 310 is stored in its PDI as a plurality of sections such as a document data section 312, a custom-dictionary section 314, a meta-words section 316, a body section 318, and a meta-streams section 320. The document data section 312 comprises terms or attributes that identify the document 310. Each of the terms in the document data section 312 is associated with a term identifier using, for example, a section-specific dictionary. The term identifiers are encoded in the order they appear in the document data section 312 as shown by term identifiers 322. In this case, the document data term identifiers are the same at positions one and four in the document data section (e.g., D.D.Id$_1$), indicating that the same document data term appears at both of these positions in the document data section 312.

The custom-dictionary section 314 comprises an in-order arrangement of document-specific terms 324. Document-specific terms are considered unique to the document 310 and are generally not found in the section-specific dictionaries used for each of the sections. Thus, when one of the document-specific terms is encountered during the translation process, the custom-dictionary section 314 is accessed and the position of that term in the custom dictionary is identified.

The meta-words section 316 comprises an in-order arrangement of prefix term identifiers 326 and 328, and, optionally, value term identifiers 328 and 332 associated with identified attributes of the document 310. As discussed above, a prefix-specific dictionary may be used to determine term identifiers for one or more prefixes. The prefix-specific dictionary used to determine term identifiers for a prefix is also used to determine a term identifier for the value associated with the prefix. In one aspect, the meta-words section 316 may comprise multiple sections with each section sharing structural and/or semantic similarity.

The body section 318 comprises an in-order arrangement of either cache indexes 336, 338 or term identifiers 334, 340 associated with terms in the body of the document 310. A cache index, such as cache indexes 336 and 338, is stored when there is a cache hit when the term's associated term identifier is processed through the entry cache. However, if there is a cache miss when a term's associated term identifier is processed through the entry cache, the term identifier, such as term identifiers 334 and 340, is stored in the PDI.

Likewise, the meta-streams section 320 comprises an in-order arrangement of either cache indexes or term identifiers (represented by numeral 342) associated with terms in the title of the document 310, headers and section headings of the document 310, and/or URLs associated with the document 310. Like above, a cache index is stored when there is a cache hit when the term's associated term identifier is processed through the entry cache. However, the term identifier is stored in the PDI if there is a cache miss when a term's associated term identifier is processed through the entry cache. In one aspect, there may be more than one meta-streams section. For instance, there may be a meta-stream section for repetitive anchor URLs, a meta-stream section for single anchor URLs, a meta-stream section for title terms, and the like.

Figure 4:
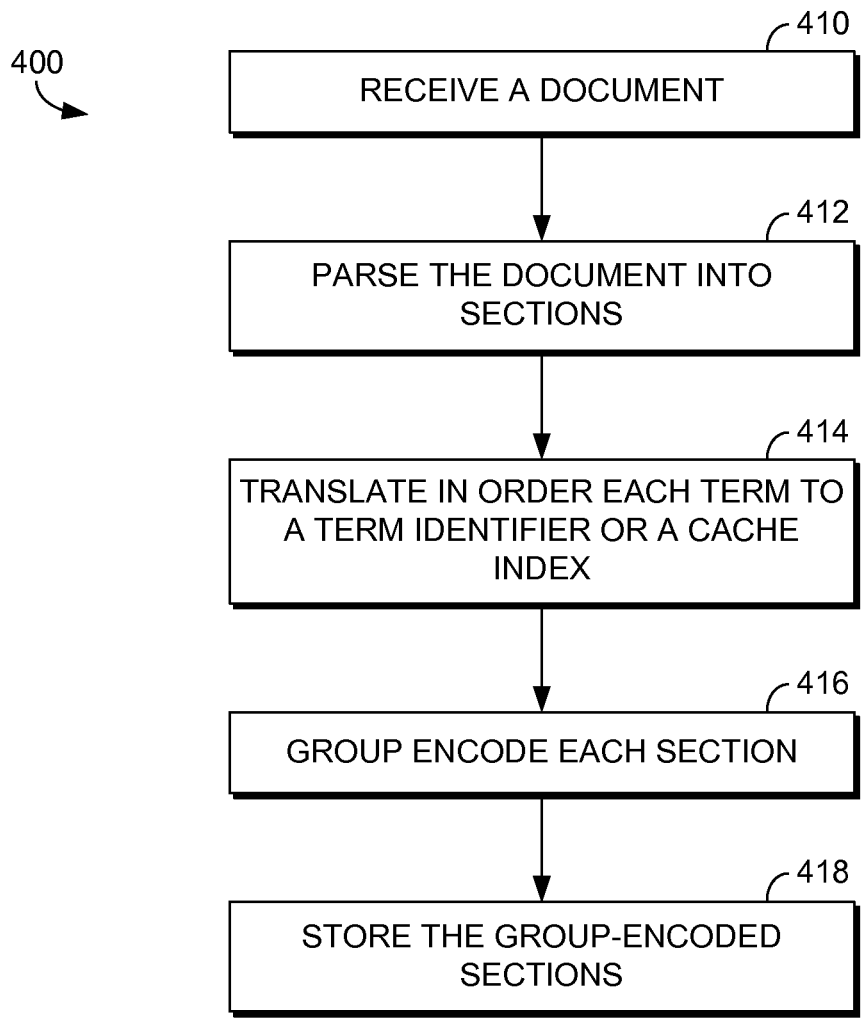
FIG. 4 is a flow diagram that illustrates an exemplary method of generating a per-document index for semantic searching in accordance with an embodiment of the present invention.

Turning now to FIG. 4, a flow diagram is depicted of an exemplary method 400 of generating a per-document index for semantic searching. At a step 410, a document is received by a receiving component such as the receiving component 218 of FIG. 2. The document may be received from a data store such as the data store 212 of FIG. 2, in response to a Web crawler extracting the document from the World Wide Web, from the document source, or from a third-party. The document may comprise one or more Web pages, Web sites, representations of documents (e.g., a PDF file), and the like. The document includes the original document along with any added annotations.

At a step 412, the document is parsed into a plurality of sections by a parsing component such as the parsing component 220 of FIG. 2. The sections may comprise a document data section that comprises terms or attributes that identify the document, and a body section comprising terms from the body of the document. The sections also include a meta-streams section(s) that comprises: 1) terms associated with the title, header, footnotes, endnotes, and/or section headings of the document; 2) URLs that reference the document (e.g., anchor URLs), are associated with the document, or are embedded in the document as hyperlinks; and/or 3) context or descriptions found where the anchor URLs are located.

Parsing the document also includes identifying attributes associated with the document and associating those attributes with meta-word terms. Document attributes are numerous. Some representative examples include originating language of the document, fingerprints associated with the document, the country, state and zip code of the document, a category corresponding to the document, and the like. Each meta-word term includes a prefix that identifies the type of attribute (e.g., fingerprint, location, category, etc.) and, optionally, a value associated with the attribute. Using the category attribute as an example, an exemplary meta-word may be "meta_CATG_retail," where "CATG" is the prefix and "retail" is the value.

Parsing the document also includes identifying known contexts associated with the documents. Known contexts may include blog postings that reference the document, social media comments, posts, and likes associated with the document, applications that routinely access the document, and the like. Parsing the document may further include creating a custom-dictionary section that comprises document-specific terms not found in the section dictionaries. Each of the document-specific terms is associated with a position in the custom dictionary.

At a step 414, each term in the document data, body, meta-words, and meta-streams sections is translated in order to either a cache index or a term identifier by a translation component such as the translation component 222 of FIG. 2. For each term, a section-specific dictionary is accessed, and the term is identified in the section-specific dictionary. The position of the term in the dictionary is used as the term identifier. If a term is not found in the section-specific dictionary, the custom dictionary is accessed to identify the term and its associated position. Term identifiers comprise numerical values that are 1-byte, 2-byte, or 3-byte. Terms that are frequently used are associated with smaller term identifiers, while terms that are infrequently used are associated with larger term identifiers.

As mentioned, each section has a section-specific dictionary. However, the body and meta-streams sections may share the same section-specific dictionary because these two sections commonly use the same terms. Further, with respect to the meta-words section, each prefix may have a corresponding dictionary, a dictionary may be shared by several prefixes, or a prefix may not have a corresponding dictionary. A prefix that does not have a corresponding dictionary will be encoded in its native form. The dictionary used for a prefix will also be used for any values associated with that prefix.

Term identifiers associated with terms in the body section and meta-streams section are further processed by passing the term identifiers through an entry cache. In one aspect, the entry cache is 1,024 terms. If there is a cache miss, the original term identifier is outputted. However, if there is a cache hit, a cache index is outputted; the cache index is 10 bits. The use of term identifiers and cache indexes allows the large amount of data associated with a document to be efficiently compressed which saves on storage space.

At a step 416, each of the sections, including the custom-dictionary section, is group encoded by an encoding component such as the encoding component 224 of FIG. 2 to generate the PDI. In one aspect, the sections are encoded 32 bits at a time. Each 32 bits contains three operational codes that can indicate that the remaining bits comprise one or more 10 bit cache indexes, terms, or term identifiers, data used to identify term position or metadata associated with the term, section and stream boundaries, and the like.

At a step 418, the PDI is stored in association with a data store such as a solid state drive (SSD). Each term in the PDI is associated with a position, which is implicitly encoded through in-order encoding, a term identifier or cache index, and any metadata associated with the term. Metadata may include font, capitalization, quantities or values, punctuation, bolding, italicizing, underlining, position with the document body, and the like.

Figure 5:
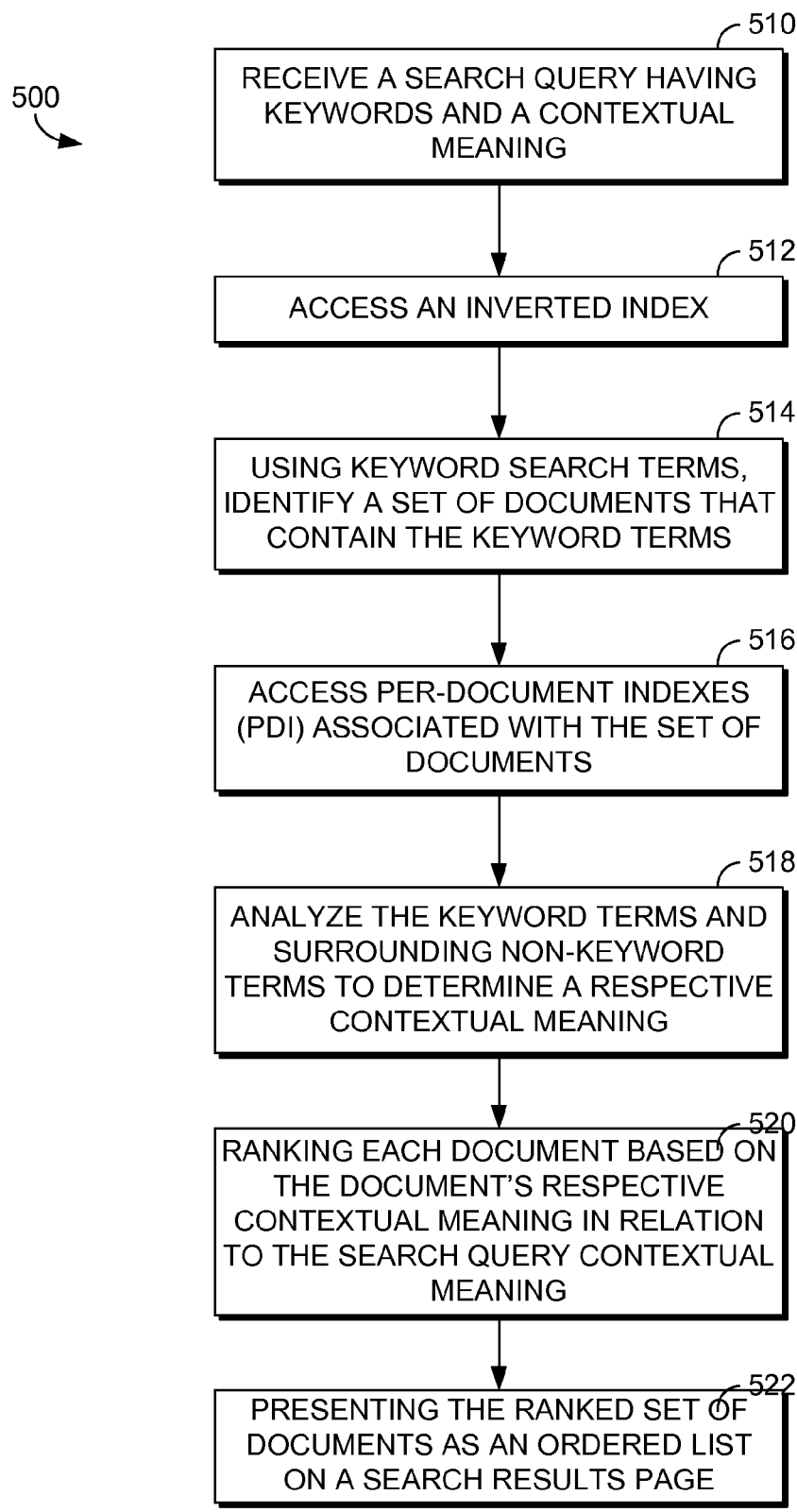
FIG. 5 is a flow diagram that illustrates an exemplary method of utilizing a per-document index in combination with an inverted index to identify contextually-relevant search results in accordance with an embodiment of the present invention.

Turning now to FIG. 5, a flow diagram is depicted of an exemplary method 500 of utilizing a PDI in combination with an inverted index to identify contextually-relevant search results. At a step 510, a search query comprising one or more keyword terms and one or more surrounding terms is received by a receiving component such as the receiving component 218 of FIG. 2. The search query may be received in response to a user inputting the query into a search box of a search engine page, or a search box associated with a Web page or Web site. The keyword terms and the surrounding terms impart a contextual meaning to the search query; this contextual meaning may be determined by a contextual analysis component such as the contextual analysis component 228 of FIG. 2.

At a step 512, an inverted index is accessed by the contextual analysis component. The inverted index comprises a mapping between keywords and documents that contain those keywords and may be stored in association with a first data store such as the data store 212 of FIG. 2. At a step 514, the contextual analysis component uses the keyword terms from the search query to identify a set of documents in the inverted index that contain one or more of the search query keyword terms. Each document in the set may be associated with a document identifier (Dodd) such as the URL of the document, or other unique identifiers such as a cryptographic hash of the URL, or a unique sequence number assigned to the document when received by the system.

At a step 516, the contextual analysis component accesses the per-document indexes associated with the set of documents using, for example, the DocIds. The PDIs may be stored in association with a second data store. In one aspect, the second data store may be the same as the first data store, while in another aspect, the second data store may be different from the first data store. In one embodiment, the second data store may comprise a SSD. Once identified and retrieved, the set of documents may be decoded using a decoding component such as the decoding component 226 of FIG. 2.

Once the set of documents is decoded, at a step 518, the contextual analysis component analyzes each document in the set to determine one or more contextual meanings associated with the each document. The contextual analysis involves locating instances of the keyword terms in a document and constructing a contextual window around the keyword term(s) that includes the keyword term(s) and one or more surrounding non-search query terms. The contextual window may include a predetermined number of terms or may include a variable number of terms sufficient to establish a contextual meaning for the contextual window. Once the contextual window is constructed, a contextual meaning is determined. A single document may contain multiple contextual windows. Each of the multiple contextual windows may share the same contextual meaning, different contextual meanings, or a combination of both. An overall contextual meaning of the document may be determined by analyzing in-order the multiple contextual windows.

At a step 520, each document in the set of documents is ranked based on the respective contextual meaning of the document as compared to the contextual meaning associated with the search query. Those documents having contextual meanings that are relevant to the search query contextual meaning or promoted in the ranking, while documents having contextual meanings that are less relevant or different from the search query contextual meaning are demoted in the ranking. At a step 524, the ranked set of documents is presented as a rank-ordered list on a search results page.

The method 500 may further comprise classifying each document in the set of documents into categories based on the contextual meaning associated with the contextual window of the document. For example, a contextual window in one document may comprise the phrase, "Traveling in Hong Kong is exciting," where "Kong" is the search query keyword term. This document may be classified in the travel category. A contextual window in a second document may comprise the phrase, "Kong toys are a favorite of dogs," where "Kong" is again the search query keyword term. This document may be classified in the pet category. Documents that share the same category are clustered together and are presented together on the search results page. Thus, the documents classified in the travel category would be presented in a group, and the documents classified in the pet category would be presented in separate group.

The method 500 may also include analyzing the structural pattern of terms in the contextual window and comparing it to the structural pattern of terms in the search query. The structural pattern is the arrangement of terms within a contextual window and/or a search query. For instance, the structural pattern of the phrase "the dog ran after the cat" is different from the structural pattern of the phrase "the cat ran after the dog" although each contains the same terms. Documents whose contextual windows have terms in the same or similar structural pattern as that of the search query may be ranked higher than documents whose contextual windows have terms in a different structural pattern as that of the search query.

The methods described above are representative examples of the different types of contextually-relevant search results that can result from using resources associated with the PDIs. The array of attributes, context, and in-order contextual windows present in the PDI can be utilized in new ways to produce ever more meaningful search results that match user intent.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. One or more computer-storage media storing computer-useable instructions that, when used by one or more computing devices, cause the one or more computing devices to perform a method of utilizing a per-document index in combination with an inverted index to identify contextually-relevant search results, the method comprising:
at a search service:
receiving a search query comprising one or more keyword terms and one or more surrounding terms;
determining a contextual meaning for the search query based on the one or more keyword terms and the one or more surrounding terms in the search query;
accessing an inverted index stored in association with a first data store associated with the search service;
using the one or more keyword terms of the search query, identifying a set of documents in the inverted index containing the one or more keyword terms;
subsequent to accessing the inverted index, accessing, forward encoded per-document indexes associated with each document in the set of documents, the forward encoded per-document indexes stored in association with a second data store associated with the search service;
using the forward encoded per-document index for the each document in the set of documents, analyzing the one or more keyword terms and surrounding terms in the each document to determine a respective contextual meaning for the each document;
ranking the each document in the set of documents based on the each document's respective contextual meaning as compared to the contextual meaning of the search query, the documents in the set of documents having a respective contextual meaning most relevant to the contextual meaning of the search query ranked higher than the documents in the set of documents having a respective contextual meaning less relevant to the contextual meaning of the search query; and
communicating for presentation on a search results page the ranked set of documents in a rank-ordered list.

2. The media of claim 1, further comprising:
classifying the each document in the set of documents into one or more categories based on the respective contextual meaning of the one or more keyword terms and surrounding terms in the each document;
clustering documents based on shared categories; and
communicating for presentation on the search results page the clustered documents.

3. The media of claim 1, further comprising: identifying a document of the set of documents whose one or more keyword terms and surrounding terms share a same structural pattern as the one or more keyword terms and the surrounding terms of the search query; and modifying the ranking of the identified document based on the same structural pattern.

4. A computerized method carried out by a search service having at least one processor for utilizing a per-document index in combination with an inverted index to identify contextually-relevant search results, the method comprising:

at the search service:
receiving a search query comprising one or more keyword terms and one or more surrounding terms;
determining, using the at least one processor, a contextual meaning for the search query based on the one or more keyword terms and the one or more surrounding terms in the search query;
accessing an inverted index stored in association with a first data store associated with the search service;
using the one or more keyword terms of the search query, identifying a set of documents in the inverted index containing the one or more keyword terms;
subsequent to accessing the inverted index, accessing forward encoded per-document indexes associated with each document in the set of documents, the forward encoded per-document indexes stored in association with a second data store associated with the search service;
using the forward encoded per-document index for the each document in the set of documents, analyzing the one or more keyword terms and surrounding terms in the each document to determine a respective contextual meaning for the each document;
ranking the each document in the set of documents based on the each document's respective contextual meaning as compared to the contextual meaning of the search query, the documents in the set of documents having a respective contextual meaning most relevant to the contextual meaning of the search query ranked higher than the documents in the set of documents having a respective contextual meaning less relevant to the contextual meaning of the search query; and
communicating for presentation on a search results page the ranked set of documents in a rank-ordered list.

5. The computerized method of claim 4, further comprising:
classifying the each document in the set of documents into one or more categories based on the respective contextual meaning of the one or more keyword terms and surrounding terms in the each document;
clustering documents based on shared categories; and
communicating for presentation on the search results page the clustered documents.

6. The computerized method of claim 4, further comprising:
identifying a document of the set of documents whose one or more keyword terms and surrounding terms share a same structural pattern as the one or more keyword terms and the surrounding terms of the search query; and
modifying the ranking of the identified document based on the same structural pattern.

7. A system for utilizing a per-document index in combination with an inverted index to identify contextually-relevant search results, the system comprising:
a computing device associated with a search service having one or more processors and one or more computer-storage media;
a first data store and a second data store coupled with the search service,
wherein the search service:
receives a search query comprising one or more keyword terms and one or more surrounding terms;
determines a contextual meaning for the search query based on the one or more keyword terms and the one or more surrounding terms in the search query;
accesses an inverted index stored in association with the first data store associated with the search service;
using the one or more keyword terms of the search query, identifies a set of documents in the inverted index containing the one or more keyword terms;
subsequent to accessing the inverted index, accesses forward encoded per-document indexes associated with each document in the set of documents, the forward encoded per-document indexes stored in association with the second data store associated with the search service;
using the forward encoded per-document index for the each document in the set of documents, analyzes the one or more keyword terms and surrounding terms in the each document to determine a respective contextual meaning for the each document;
ranks the each document in the set of documents based on the each document's respective contextual meaning as compared to the contextual meaning of the search query, the documents in the set of documents having a respective contextual meaning most relevant to the contextual meaning of the search query ranked higher than the documents in the set of documents having a respective contextual meaning less relevant to the contextual meaning of the search query; and
communicates for presentation on a search results page the ranked set of documents in a rank-ordered list.

8. The system of claim 7, wherein the search service further:
classifies the each document in the set of documents into one or more categories based on the respective contextual meaning of the one or more keyword terms and surrounding terms in the each document;
clusters documents based on shared categories; and
communicates for presentation on the search results page the clustered documents.

9. The system of claim 7, wherein the search service further:
identifies a document of the set of documents whose one or more keyword terms and surrounding terms share a same structural pattern as the one or more keyword terms and the surrounding terms of the search query; and
modifies the ranking of the identified document based on the same structural pattern.

* * * * *